(12) United States Patent
Stone

(10) Patent No.: US 11,271,979 B2
(45) Date of Patent: *Mar. 8, 2022

(54) DETERMINING LOCATION WITHIN VIDEO CONTENT FOR PRESENTATION TO A USER

(71) Applicant: Comcast Cable Communications, LLC, Philadelphia, PA (US)

(72) Inventor: Christopher Stone, Newtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/804,216

(22) Filed: Nov. 6, 2017

(65) Prior Publication Data

US 2018/0288122 A1 Oct. 4, 2018

Related U.S. Application Data

(63) Continuation of application No. 13/724,640, filed on Dec. 21, 2012.

(51) Int. Cl.
*H04L 29/06* (2006.01)
*H04L 65/613* (2022.01)
*H04L 65/612* (2022.01)

(52) U.S. Cl.
CPC ...... *H04L 65/4092* (2013.01); *H04L 65/4084* (2013.01)

(58) Field of Classification Search
CPC ....... G11B 27/28; G11B 27/34; G11B 27/105; G11B 27/329; G11B 2220/20; G11B 2220/90; G11B 2220/2562; G11B 20/00086; G11B 27/36; G06Q 30/02; G06Q 30/06; G06Q 30/061; G06Q 30/0641; H04L 29/06; H04L 29/0809; H04L 29/08072; H04L 29/08981; H04L 65/4092; H04L 65/4084; H04L 29/08; H04L 65/60; H04L 67/32; H04N 5/76; H04N 5/85; H04N 5/4401; H04N 7/17318; H04N 5/44543; H04N 9/8042; H04N 21/812; H04N 21/4532; H04N 21/4622; H04N 21/25891; H04N 21/44222; H04N 5/93; H04N 5/907; H04N 5/913; H04N 9/8205; H04N 21/4522; H04N 21/4632; H04N 2005/91314; H04N 2005/91371; H04N 7/1731; H04N 21/47; H04N 21/472; H04N 21/475; H04N 21/858; H04N 21/8583; H04N 21/4725; H04N 21/4755; H04N 21/47815; H04N 21/47205; G06F 13/00

(Continued)

(56) References Cited

U.S. PATENT DOCUMENTS 9,225,795 B2 * 12/2015 Mostafa .................. H04L 67/32
2002/0012521 A1 1/2002 Nagasaka et al.

(Continued)

*Primary Examiner* — Robert B Harrell
(74) *Attorney, Agent, or Firm* — Banner & Witcoff, Ltd.

(57) ABSTRACT

By way of example, a method, apparatus, system, and software are described for using a previously-identified location within content, such as a splash screen indicating a transition between main program content and a commercial segment, to skip to a subsequent location in the content, such as a location at which a subsequent appearance of the splash screen is detected. This may allow for an at least partially automated recognition-based content skipping feature.

20 Claims, 7 Drawing Sheets

(58) Field of Classification Search
USPC .............. 386/241, 248, 249, 240, 255, 278; 709/217; 715/719; 725/34
See application file for complete search history.

(56) References Cited

U.S. PATENT DOCUMENTS

| | | |
|---|---|---|
| 2003/0020743 A1 | 1/2003 | Barbieri |
| 2005/0289587 A1 | 12/2005 | Chiu |
| 2007/0297755 A1* | 12/2007 | Holt ..................... G11B 27/034 386/240 |
| 2009/0097814 A1 | 4/2009 | Harris |
| 2011/0123173 A1 | 5/2011 | Ruffini et al. |
| 2013/0132515 A1* | 5/2013 | Mostafa .................. H04L 67/32 709/217 |

\* cited by examiner

DETERMINING LOCATION WITHIN VIDEO CONTENT FOR PRESENTATION TO A USER

This application is a continuation of U.S. patent application Ser. No. 13/724,640, filed Dec. 21, 2012, which is hereby incorporated by reference as to its entirety.

BACKGROUND

It is not unusual for television programs, movies, and/or other scheduled, stored, and/or on-demand content to include commercial advertising at one or more locations within the content. It is also not unusual for a user viewing the content to desire skipping the commercials. Traditionally, this has been done by initiating manual fast-forward or skip-forward commands (for skipping forward by a pre-set amount of time in the content) at the appropriate times. However, this is not always convenient to the user.

Moreover, where the content is being streamed to the user over a network resource, such fast-forward and skip-forward commands often invoke sending trick-play files (e.g., fast-forward trick-play files) over the network. Because such trick-play files typically contain little or no repetitive content data between video frames, such trick-play files may not be as highly compressible as the main content. Therefore, it may be expected that the trick-play files, and in turn the acts of skipping commercials, consume a relatively large amount of network bandwidth.

Solutions have been provided in which a user can tag content with a particular time stamp during an initial viewing of the content. Upon subsequent viewings, the user can issue a command to jump to the particular time stamp location within the content. However, this is of little value for content that has not yet been viewed by the user. Nor is this convenient where there are multiple instances of commercials scattered throughout the content.

SUMMARY

One or more aspects as described herein may be directed to a method, apparatus, system, and software for transmitting content over a network to a device, and in response to detecting a command from the device initiated during presentation of the content, performing at least the following: determining at least a portion of an image based on the content, and using the at least portion of the image to determine a location within the content. In some implementations, the content may be transmitted over the network to the device beginning at the determined location.

Further aspects as described herein may be directed to a method, apparatus, system, and software for determining at least a portion of a third image based at least on at least a portion of a first image and at least a portion of a second image, and using the at least portion of the third image to determine a location within content. In some implementations, the content may be sent over a network to a device beginning at the determined location.

Still further as described herein may be directed to a method, apparatus, system, and software for presenting content including a splash screen, and determining a first portion of the content. The identified first portion may be used to determine a different second portion of the content that includes the splash screen.

These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
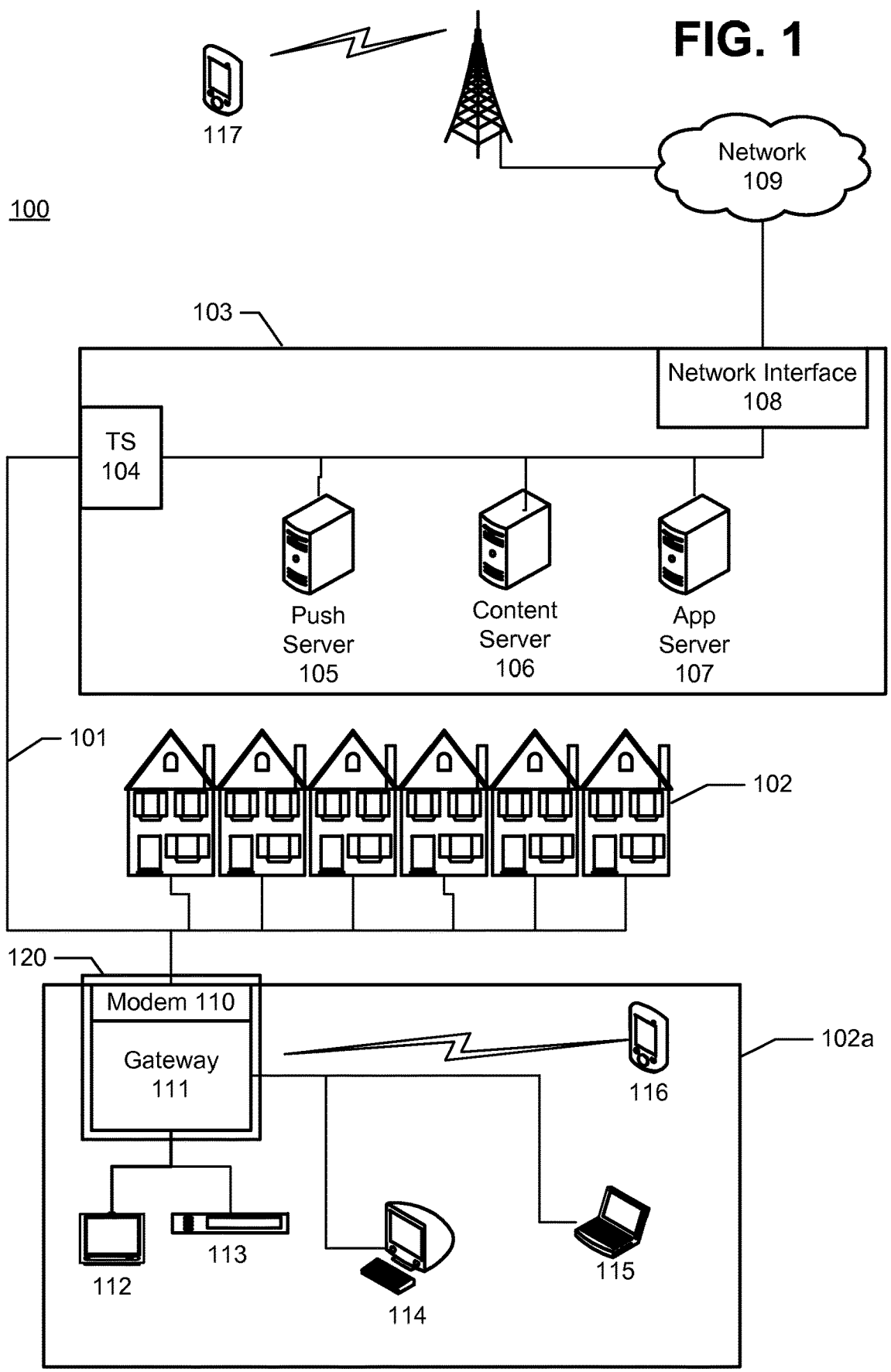
FIG. 1 illustrates an example network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network or a hybrid fiber/coax (HFC) distribution network. Such networks 100 use a series of interconnected communication links 101 (e.g., coaxial cables, optical fibers, wireless links, etc.) to connect multiple homes 102 or other user locations to a local office or headend 103. The local office 103 may transmit downstream information signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS), which may be a computing device configured to manage communications between devices on the network of links 101 and backend devices such as servers 105-107 (to be discussed further below). The TS 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet Protocol devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones, or other network devices. For example, the network 109 may communicate with one or more content sources, such as multicast or unicast video sources, which can supply video streams for ultimate consumption by the various devices (e.g., client devices, user devices, etc.) in the homes 102.

As noted above, the local office 103 may include a variety of computing device such as servers 105-107 that may be configured to perform various functions. For example, the local office 103 may include a push notification server 105 that can generate push notifications to deliver data and/or commands to the various homes 102 in the network (or more specifically, to the devices in the homes 102 that are configured to detect such notifications). The local office 103 may also include a content server 106 configured to provide content to users in the homes. This content may be, for example, video on demand movies, television programs, songs, text listings, etc. The content server may include software to validate user identities and entitlements, locate and retrieve requested content, encrypt the content, and initiate delivery (e.g., streaming) of the content to the requesting user and/or device.

The local office 103 (e.g., a data processing facility) may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be used to implement a cache server for the content found on the content server 106. Other example application servers may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include an interface 120, which may comprise a gateway device 111 and a modem 110, and/or which may include transmitters and/or receivers used to communicate on the links 101 and with the local office 103. The modem 110 may be, for example, a coaxial cable modem (for coaxial cable links 101), a fiber interface node (for fiber optic links 101), or any other desired device having similar functionality. The gateway device 111 may be connected to, or be a part of, a gateway interface device. The gateway interface device may be a computing device that communicates with the gateway device 111 to allow one or more other devices in the home to communicate with the local office 103 and other devices beyond the local office.

The gateway device 111 may be a set-top box (STB), digital video recorder (DVR), computer server, or any other desired computing device. The gateway device 111 may also include (not shown) local network interfaces to provide communication signals to devices in the home, such as televisions 112, additional STBs 113, personal computers 114, laptop computers 115, wireless devices 116 and/or 117 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Any of the devices in the home, such as the gateway 111, STB 113, computer 114, etc., can include an application software client that can make use of the video images captured by the image capture servers.

Figure 2:
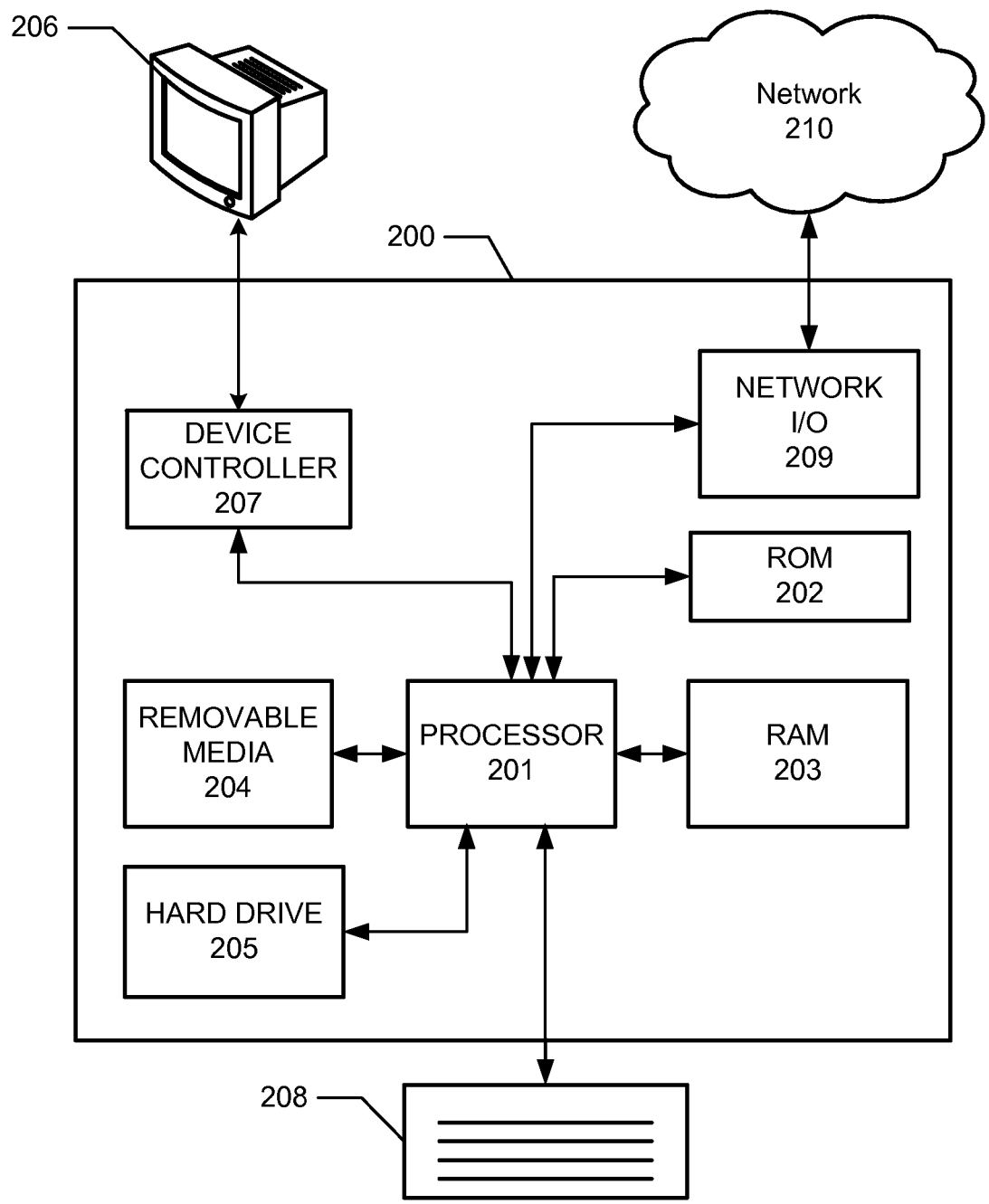
FIG. 2 illustrates an example hardware and/or software platform on which the various elements described herein can be implemented.

FIG. 2 illustrates, by way of example, general hardware and software elements that can be used to implement any of the various computing devices and/or software discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

As described previously, content may be sent (e.g., streamed and/or downloaded) by a service provider (such as via termination system 104) to a device (such as to a user device via an interface such as modem 110 and/or gateway 111). The content may include video, audio, and/or other data such as closed captioning data, metadata, time stamp data, other information, and the like. In the following examples, the content will be described as including at least video. However, the content may include any combination of information (e.g., high speed data) as desired.

Typically, content that has one or more instances of commercials (e.g., advertisements, promotions infomercials, and/or supplemental information) includes a video splash "screen" as a transition between a segment of commercials and the main content. The splash screen may be located at transitions from main content to commercials, and/or at transitions from a segment of commercials to main content. The splash screen may include a single static image, and/or a video clip. While not required, the splash screen for a particular item of content is often identical, or at least similar, at each transition. The splash screen is also often associated with the particular content in which it is contained. For example, where the main content is a particular television show or movie, the splash screen may identify the particular television show or movie (e.g., via text, graphics, video, a logo, etc.). Because the splash screen (or a close variation thereof) is often repeated at each transition, this predictability may be leveraged to provide a potentially convenient and efficient way to detect the beginning and end of commercial segments within content.

Figure 3:
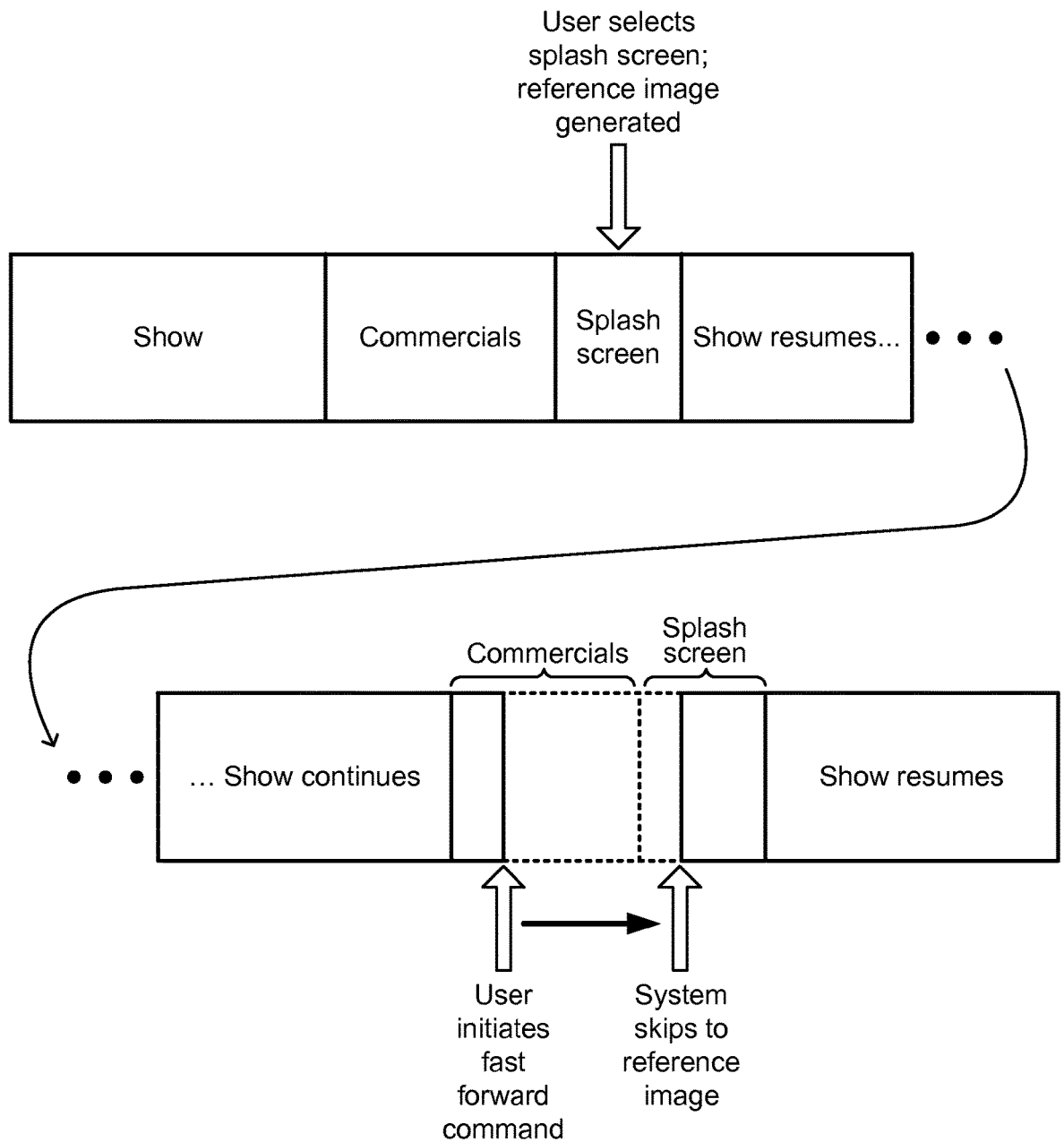
FIG. 3 illustrates an example of content structure and of how portions of content may be skipped.

An example of how this may work is described with reference to FIG. 3. In this example, the content includes main content as a television show ("Show"), as well as two commercial segments ("Commercials"). While two commercial segments are shown (each segment having one or more commercials), it will be understood that any number of commercial segments may be included in the content. As also shown in the example of FIG. 3, the content may further include a splash screen located at one or more of the transitions from the show to a commercial segment and/or from a commercial segment to the show. Each of the splash screens may be identical to one another, or at least visually similar to each other. Each of the splash screens may also consume a certain amount of time (e.g., a certain plural number of video frames, which may be consecutive video frames for a given commercial segment) within the content. For example, each splash screen may include a video clip lasting several seconds (e.g., two or more seconds, or five or more seconds). Each splash screen may additionally or alternatively contain a still image in one or more video frames.

As the user views the show, such as via a content consumption device such as any of elements 112, 113, 114, 115, 116, or 117, the first commercial segment may begin to be displayed to the user. The user may continue viewing the commercials at normal speed or may fast-forward through the commercials such as using known fast-forward and/or skipping techniques. When the splash screen appears during the transition at the end of the commercials and the beginning of the resumed show, the user may press a button and/or provide some other type of user input indicating a selection of the displayed splash screen. This selection is indicated by way of example as an arrow pointing toward the first instance of the splash screen. While the splash screen may include plural video frames, the actual selection may be a selection of only a single representative one of those video frames. In the shown example, the selection is made approximately halfway through the splash screen timeframe.

To make the selection, the user may initiate the user input while the splash screen is being displayed, and the selected video frame within the splash screen may depend on when the user input is made. While the user input may be made during any playback mode such as a play, fast-forward, or slow-motion mode, the user input may alternatively be made during a pause mode. In such a case, the user may pause the content at some point during display of the splash screen. Then, while the content is paused, the user may provide user input indicating that the currently-displayed video frame (or some other video frame based on the currently-displayed video frame) may be the selected video frame. By first pausing the video, the user may be able to provide a more accurate intentional selection. In other examples, the user may not need to pause the video to select one or more video frames, and/or the user may be able to instruct the device (e.g., via a user command) to automatically detect a splash screen and/or to automatically make a selection of one or more video frames from the detected splash screen. In still further examples, the selection of a particular location in the content may not be a particular identified one or more video frames, and may be some other identified point in the content.

The selected video frame or other identified point in the content may be used to derive a reference image, or portion thereof, to be recognized at a later point in the content. For example, the at least portion of the reference image may be the image (or portion thereof) contained within the selected video frame. Or, as will be described further below, the at least portion of the reference image may be the result of a combination of images including the selected video frame. Further examples will be described with reference to a reference image and images in content video frames, however it will be understood that these examples may also be used with portions of reference images and portions of the images in content video frames. A portion of an image may be any continuous portion of collection of non-contiguous sub-portions. For instance, a portion of an image may include just a middle portion of the image, or only a top portion of the image, or a combination of a left portion and a right portion (without a middle portion) of the image.

As the show resumes, the user may continue to view the show until the next segment of commercials is displayed. At this point (or at any point during the content, not necessarily only during commercials), the user may provide a particular user input indicating a desire to skip to the next instance of the reference image. The user input may, for example, be the press of a button, a gesture, or a voice command. In response to the user input, the system may parse the content going forward until the reference image (or a sufficiently similar image to the reference image) is found within the content. Once the reference image is found, the content may skip to that point and continue to be displayed to the user from that point forward. Thus, the portion of the content between the initiation of skipping to the resuming of playback may be entirely skipped (e.g., not displayed or otherwise provided to the user and/or the user's content consumption device).

While the initial user selection that resulted in determining the reference image was made during the first commercial segment within the content, such a selection may be made during any of the commercial segments. For example, the user may make the selection during the second commercial segment, resulting in the reference image. Then, the reference image may be used to assist with the above-discussed skipping for any of the commercial segments, including the first commercial segment (upon repeated playback) and any subsequent commercial segment. Moreover, while the splash screens are shown in FIG. 3 as occurring during transitions from commercial segments to the show, transitions may additionally or alternatively be located during transitions from the show to commercial segments.

It should also be noted that, while the reference image may be determined to be an image related to a splash screen, the concepts described herein may be used for any reference image, even if the reference image is not part of or otherwise related to a splash screen. For instance, the reference image may be any image desired, especially one that is expected to be repeated during the content (e.g., be displayed at multiple different times throughout the content). As another example, it may be that while a portion of a splash screen may be expected to remain constant for each transition, another portion of the splash screen may be expected to change from transition to transition. For instance, during a showing of a basketball game, the splash screens may each include the current score of the game. Since the score is expected to change during the game, the portion of the splash screen showing the score may be excluded (e.g., ignored) during the comparison of the video content with the reference image. Or, the reference image may not include that portion of the screen that includes the scores. This may be done, for instance, by allowing the user to select only a portion of the splash screen such as by using an area selection tool and/or selecting from a menu of predetermined portions (e.g., lower half, upper half, left half, right half, one of the four quadrants of the screen, etc.). Additionally or alternatively, the comparison algorithm itself may not require an exact match between video frames and the reference image, such that the change in score may not change, e.g., a sufficient number of pixels to prevent a "match" from being found between a video frame of the content and the reference image.

The parsing of the content may be performed by any element in the system. For example, the parsing may be performed by a device or system of devices of the content service provider, such as by any one or more of servers 105-107. Alternatively, the content parsing may be performed locally by the user's content consumption device (e.g., any of devices 110-117). A potential advantage to having the service provider perform the parsing is that the skipped content may not need to be provided over the network to the user. For instance, referring to FIG. 3, the portion of the content indicated by broken lines (the skipped portion) may not be sent over link 101 to the user's device. This may have the effect of reducing the amount of bandwidth needed to send the content over link 101 as compared to, for instance, traditional trick-play fast forwarding techniques. If the server or other one or more computers performing the parsing is sufficiently powerful, the amount of time to parse and skip to the appropriate point in the content may be on the order of, e.g., milliseconds. In other words, the delay may be nearly undetectable by the user. However, the delay may be longer if the system is less powerful or burdened by excess usage. It may also be that any downside of excess processing power used for the parsing is considered far outweighed by the potential upsides of utilizing less network bandwidth and/or of providing a better end-user experience.

When the reference image is determined for a given item of content and/or for a given user, the reference image (and/or a pointer to the reference image) may be stored in one or more computer-readable media for later reference. The reference image (and/or pointer thereto) may be associated with the particular content and/or with the particular user(s) who made the selection(s) resulting in the reference image. Since each show or other content may have its own unique splash screen, such an association between each reference image and an item of content may allow the system to retrieve the appropriate reference image for a given item of content. For example, the stored data in the one or more computer-readable media may take the following form as in Table 1. While a tabular form of the data is shown, this is only an example and the data may be stored and/or associated with each other in any manner desired. Moreover, the data may be in the form of and/or accessible by a database system, such as one that utilized a relational database structure. In such an example, the system may query the database using the currently-playing content and retrieve the associated reference image for that content.

TABLE 1

| CONTENT | USER | REFERENCE IMAGE |
|---|---|---|
| content 1 | user A | reference image 1 |
| content 2 | user A | reference image 2a |
| content 2 | users B and C | reference image 2b |
| content 3 | all users | reference image 3 |
| ... | | ... |

As can be seen in this example, each reference image may be associated with one or more particular users. However, each reference image may alternatively not be associated with any particular user(s), and may be universal for all users of the system and only keyed to particular items of contents. In such a case, there may be no USER column in Table 1.

Figure 4:
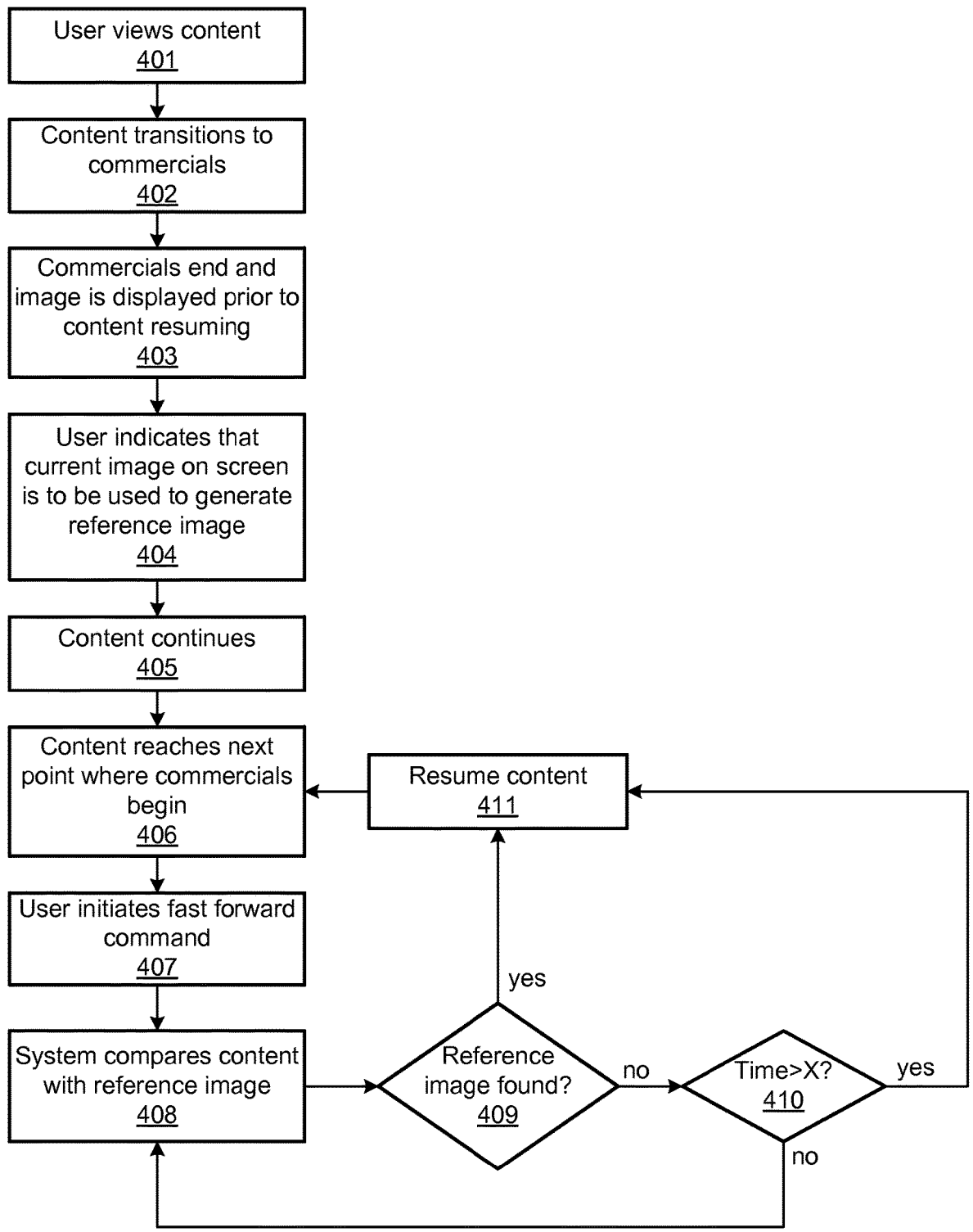
FIG. 4 is a flow chart showing example steps that may be performed to implement various features as described herein.

FIG. 4 is a flowchart showing example steps that may be performed in one or more aspects as described herein. The steps may be used, for instance, to obtain and/or utilize the reference image to skip content to the next instance of the reference image. At step 401, the user is viewing the content as described previously. At step 402, the content transitions to a commercial segment. At step 403, the commercial segment ends and the splash screen is displayed for a period of time (e.g., a few seconds). As previously described, at some point during the splash screen, at step 404 the user may provide a user input indicating a desire to select a reference image. For instance, the user may pause the video at the desired location, and then make the appropriate selection user input. The user's selection may be transmitted upstream as data to the service provider's system, such as via link 101 to one or more of servers 105-107. The transmitted user selection data may indicate, for instance, the identity of the currently-viewed video frame (e.g., via a timestamp, video frame number, or other indication), the identity of the user, the identity of the content being viewed, and/or any other information desired.

In response to the user selection data, the service provider system may determine an appropriate reference image. In the most basic situation, the reference image may be the image (or portion thereof) of the identified video frame. In other situations, the reference image may be only partly based on the identified video frame. These other situations will be described further below with reference to FIGS. 6-7.

Returning to FIG. 4, the system stores the reference image and associates it at least with the currently-viewed content. At step 405, the content continues, and the show resumes being displayed to the user. At step 406, the content then reaches the next (or any subsequent) instance of a commercial segment. At this point, at step 407, the user may desire to skip the commercials by providing the appropriate skip user input. The user input may cause particular data (e.g., a skip command) to be sent upstream to the service provider (e.g., to one or more of servers 105-107). In response to the received skip command, the service provider system may, at step 408, retrieve the reference image associated with the content and compare subsequent portions of the content (e.g., on a video-frame by video-frame basis) with the reference image.

The comparison may be a direct matching, e.g., a determination of which, if any, of the future video frames contains an image that perfectly matches each pixel of the reference image. Or, the comparison may be one that looks for a video frame containing an image that is sufficiently close to the reference image. For instance, an image differencing algorithm such as a tree matching algorithm may be used to determine a difference between each video frame image and the reference image, and if the difference is below a preset threshold quantity, then the image may be considered a match with the reference image. As another example, the algorithm may be as follows: performing a logical AND on each pixel of interest (ANDing each pixel of a video frame image with the corresponding pixel of the reference image, and if at least a threshold number or percentage of the comparison is TRUE, then the video frame image would be deemed a sufficient match with the reference image. Other possible ways to compare the video frame images with the reference image may be used.

Such a comparison may be performed in connection with steps 409-411. In this example, at step 409, if the reference image is not yet found in one of the content video frames (e.g., if the comparison results in a match), then the process moves to step 410, at which point the system determines whether a timeout should occur. For instance, the system may allow the loop of steps 408-410 to occur only up to a predetermined number (X) of times (e.g., the equivalent of several minutes of video frames). This recognizes the possibility that a matching video frame is never found, which may occur for example if the content is near the end or if the reference image is inaccurate. If a timeout has not yet occurred, then the process repeats for the next video frame of content at step 408. If the timeout has occurred, then the process moves to step 411, at which point the content is resumed (e.g., playback is resumed). The content may resume at the point at which the user indicated the skip command, or at some other point in the content, such as a predetermined amount of time after the skip command (e.g., thirty seconds into the content after the skip command). The user may also be presented with a displayed message, such as one indicating that no further splash screens are found in the content.

If, however, a matching video frame is found at step 409, then the process moves to step 411, at which point the system resumes the content at the matched video frame. Rather than resuming the content precisely at the matching video frame, the content may be resumed at another video frame that is based on the matching video frame. For instance, the content may resume at a video frame that is a predetermined number of video frames (e.g., at least five, or at least one hundred video frames) before or after the matching video frame.

It is noted that the process of FIG. 4 may also be performed so as to search for matching reference images in the content in a reverse direction (in the rewind direction). In such a case, the process of steps 408-411 may be performed by searching in a reverse direction of time in the video frames occurring prior to the skip command. In such a case, there may be two types of skip commands—forward skip or reverse skip. Or, the skip may be performed in a forward or reverse direction that automatically depends upon whether the content is currently being viewed in a forward or reverse direction.

Figure 5:
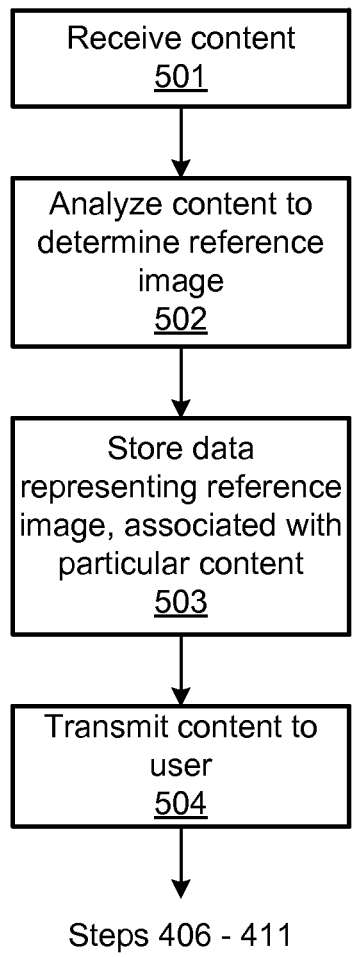
FIG. 5 is another flow chart showing example steps that may be performed to implement various features as described herein.

Thus far, examples have been described in which the end user (the user who views the delivered content) directly or indirectly selects the reference image for a given item of content. Alternatively, the reference image may be selected by the service provider system or by another entity without utilizing input by the user. For instance, the service provider may perform such reference image selection independently, such as upon initial content ingest. This may be performed even before the content is ever delivered to a user. FIG. 5 shows an example process of how this may work. At step 501, the service provider system may receive (e.g., ingest) the content from another source, such as from a content originator (e.g., a television network). At step 502, the service provider may utilize one or more computers (e.g., one or more of servers 105-107) to analyze the content for repeated images. For instance, the system may recognize that a particular video segment and/or a particular one or more images are shown multiple times at various points throughout the content. Moreover, the separation between each instance of the repeated segment or content is separated by an amount of time that would be consistent with commercial breaks. Thus, for instance, the system may automatically look for a content portion (e.g., an image, set of images, or video segment) that repeats within the content, and in which the repeated instances are separated by at least a predetermined amount of time or by an amount of time within a predetermined range of times. The predetermined amount of time might be, for instance, five minutes, or ten minutes, or any other amount of time. The predetermined range of times might be, for instance, between five and ten minutes, or any other range of times. Using such an analysis, it may be reasonably assumed that the repeating content portion represents a splash screen. Additionally or alternatively, the splash screen may be manually recognized using human intervention at the service provider end.

The system may then, at step 503, determine and store the appropriate reference image (e.g., the image within a particular video frame of the repeated content portion), and associate the reference image with the particular item of content. At step 504, then system may then stream or otherwise send the content to one or more users as desired, such as on a scheduled or on-demand basis. The next time that one of the users issues a skip command, the system may use the already-determined reference image to perform steps 406-411 in the manner as previously described herein.

As can be seen from the previous description, the reference image may be determined in a variety of ways. For instance, as mentioned previously, the reference image may be based on a combination of inputs from a plurality of different users of the system. As an example, assume that each of three users has on-premises equipment configured such as in element 102a of FIG. 1. Thus, each of the users may receive content and may provide selections during content. For instance, each of the users, when viewing a particular item of content, may perform step 404 by indicating a current image of the content that may be used to generate or otherwise determine the reference image. If each of the three users selects a particular video frame within a splash screen of the same item of content, it is likely that they would each choose a different video frame. Moreover, each of the three video frames may or may not contain the identical image.

Figure 6:
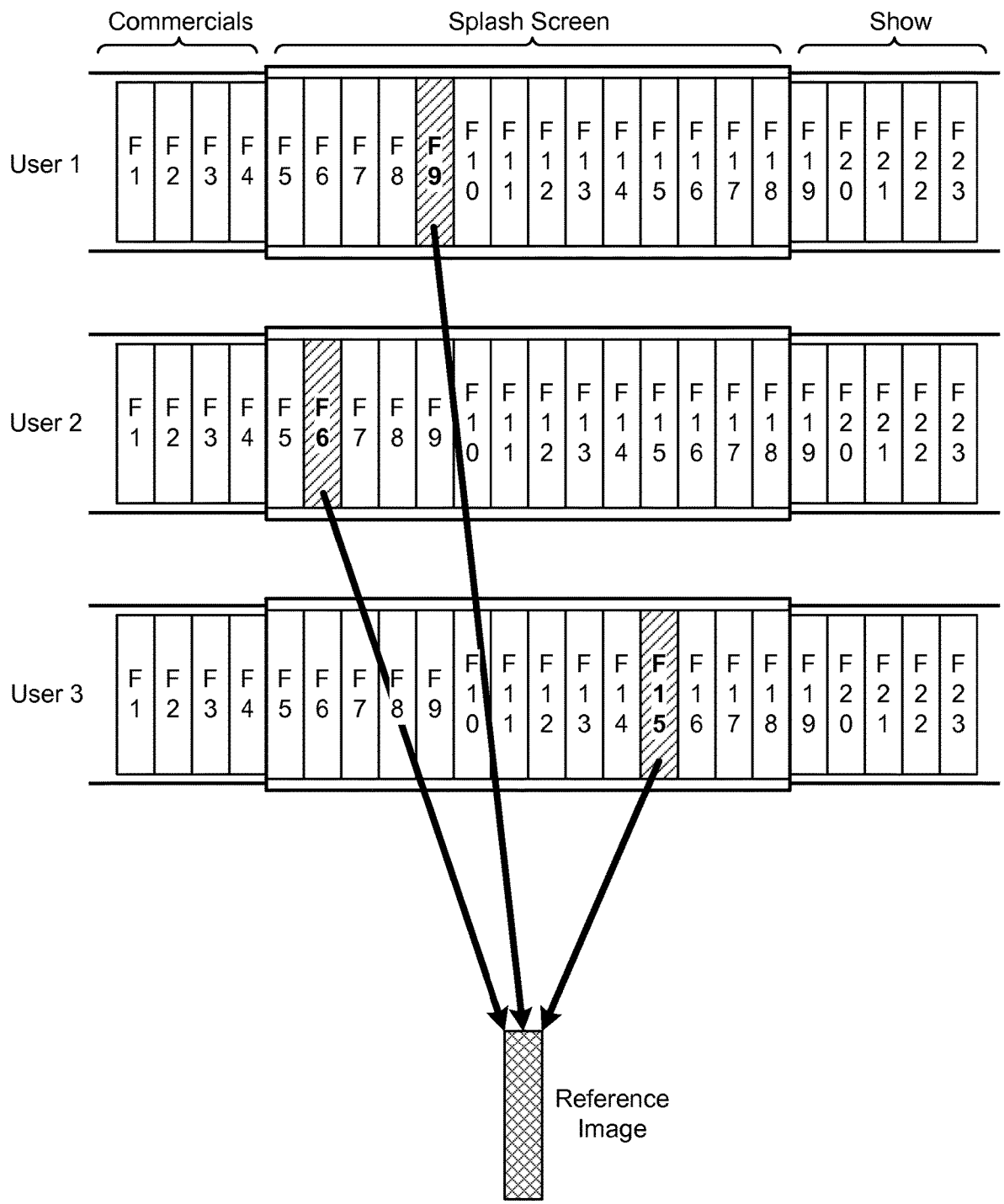
FIG. 6 illustrates an example of video frames.

Accordingly, it may be desirable to combine the inputs from the three users, with the expectation that the combined selection of video frames may more accurately reflect an appropriate reference image than any single one of the users. This is because an individual user may not be quick or accurate enough with the pause button or with the reference image selection function (and may even accidentally choose a video frame outside the splash screen), and also because it is largely a matter of subject choice as to which video frame is to be chosen within a set of video frames representing a splash screen. An example of three user selections is shown in FIG. 6. As can be seen, User 1 selects video frame F9, User 2 selects video frame F6, and User 3 selects video frame F15. Fewer or greater users may be involved in selecting the reference image, and so three users is only an example. In practice, there could be hundreds or even thousands of users providing such video frame selections.

As indicated in FIG. 6, the reference image may be determined using some or all of the user-selections of video frames F9, F6, and F15.

For example, the reference image may be a video frame of the content that is based on the selected video frames, such as a video frame located at a location based on an average of the selected video frame positions. For instance, in FIG. 6, the average location of video frames F9, F6, and F15 would be video frame F10. The determination (e.g., average) may be weighted or not, and may exclude one or more of the user inputs as desired. For instance, while all three of the users have selected video frames within the splash screen, it is conceivable that one or more of the user may select a video frame that is outside the splash screen. This may be evident where the one or more users have selected a video frame at a position that is far outside (e.g., exceeds a threshold distance from) the average of the selected video frame positions. In such a case, those selected video frames exceeding the threshold distance, and/or a predetermined number or percentage of those video frames that are farthest from the average, may be discarded and not included in the final determination of the reference image.

In other examples, the selected video frames may be combined using some other location-based algorithm, such as taking the mean of the video frame locations within the content. In still further examples, the reference image may not necessarily be the image of one of the content video frames, but rather may be an image that is generated as a combination of the images of multiple selected video frames. For instance, if video frames F9, F6, and F15 each contain or otherwise represent, respectively, images Image9, Image6, and Image15, then the reference image may be a combination of Image9, Image6, and/or Image15. The images may be combined using any algorithm desired, such as by taking the average or mean of each pixel in the image. It is noted that not all video frames are necessarily sent as entire images. For example, the MPEG standard compresses video by defining different types of video frames, including I-frames, P-frames, and B-frames. While I-frames typically contain a full video frame image, P- and B-frames contain a reduced set of image information that may be combined with other video frames to result in an image. In such a case, for example, each of video frames F1-F23 in FIG. 6 may be any of those three video frame types. And, in such a case, the image contained in or otherwise represented by each of the video frames F1-F23 may be considered to be the image fully contained by a single I-frame or represented (e.g., encoded) by a combination of that video frame and one or more other P, B, and/or I-frames. For instance, if video frame F5 is an I-frame and video frame F6 is a P- or B-frame, then the image represented by video frame F6 may be considered to be the image derived from (e.g., encoded by) video frames F5 and F6 together.

The above-discussed examples of combining user selections to determine the reference image may be performed as part of, for example, steps 404 or 502, and may be performed by one or more computing devices of the service provider such as servers 105, 106, and/or 107.

Figure 7:
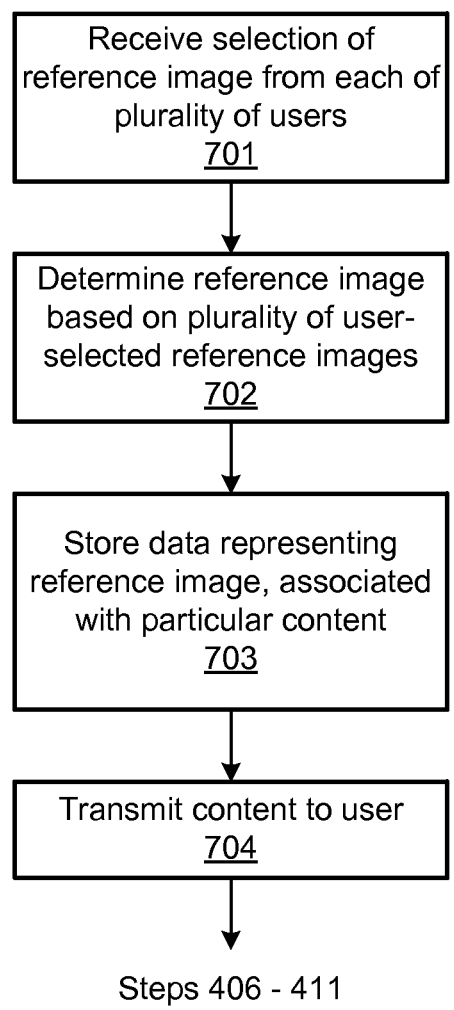
FIG. 7 is another flow chart showing example steps that may be performed to implement various features as described herein.

FIG. 7 is a flow chart of example steps that may be performed, such as to use combined user selections to determine a reference image for a particular item of content. At step 701, the service provider (e.g., one or more of servers 105, 106, and/or 107) may receive, from each of a plurality of users of the network, a selection indicating a particular video frame (or set of video frames) from a particular item of content. While step 701 is shown as a single box, it is noted that step 701 may be performed at different times for different users. At step 702, the reference image may be determined by utilizing a combination of the user inputs, such as in one of the manners described above. At step 703, the determined reference image may be stored as data and associated with the particular item of content. At step 704, the service provider (e.g., through TS 104) may stream or otherwise provide the content to one or more users (which may or may not include one or more of the users who made the selections at step 701). As the content is being provided, steps 406-411 (previously described) may be performed for controlling viewing of the content by the receiving users. While steps 701-704 and 406-411 are shown in a particular order in FIG. 7, it is noted that various ones of the steps may be performed in other orders and/or repeated as appropriate. For example, it may be desirable to continuously or intermittently re-determine (e.g., update) the reference image for a particular item of content as new users provide their own selections of video frames for that content. Once a satisfactory number of user selections have been made for a particular item of content, there may no longer be a need or desire to perform steps 701-704, and the reference image (now pre-determined) may be used for any user interactions with the content in the future.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method comprising:
   determining, by at least one computing device, a first image at a first location within video content;
   determining, based on the first image, a second image that is within the video content and that corresponds to the first image;
   determining a second location that is within the video content and that is associated with the second image; and
   causing a device to output the video content beginning at the second location.

2. The method of claim 1, further comprising receiving, from the device, an indication that is associated with a video frame of the video content and that is based on a user command initiated during output of the video content, and wherein the determining the first image comprises determining the first image based on the indication.

3. The method of claim 1, wherein the determining the first image comprises selecting the first image from a plurality of predetermined images within the video content.

4. The method of claim 1, wherein the determining the second image based on the first image comprises determining the second image as an image that matches the first image.

5. The method of claim 1, further comprising comparing the first image with the second image to determine a difference between the first image and the second image, wherein the determining the second image is performed based on a comparison of the difference with a predetermined threshold difference.

6. The method of claim 1, further comprising causing the device to output the video content, including the first image, beginning prior to the first location, wherein the determining the first image is performed while the device is outputting the video content that includes the first image.

7. The method of claim 1, wherein the determining the first image comprises:
- receiving an indication of a third image, within the video content, that was selected by a first user;
- receiving an indication of a fourth image, within the video content, that was selected by a second user; and
- generating the first image based on the third image and the fourth image.

8. The method of claim 1, wherein the determining the second image comprises comparing the first image with each of a plurality of other images within the video content, wherein the plurality of other images comprises the second image, and determining based on the comparing that the second image corresponds to the first image.

9. The method of claim 1, wherein the determining the first image comprises:
- receiving an indication of a third location of a third image, within the video content, that was selected by a first user;
- receiving an indication of a fourth location of a fourth image, within the video content, that was selected by a second user;
- determining the first location based on the third location and the fourth location; and
- determining the first image based on the first location.

10. The method of claim 1, wherein the second image is associated with a video frame of the video content.

11. A method comprising:
- determining a first location, within video content, of a first image selected in accordance with first user input;
- determining a second location, within the video content, of a second image selected in accordance with second user input;
- determining, based on the first location and the second location, a third location within the video content;
- determining a reference image that is at the third location within the video content;
- determining, based on the reference image, a third image that is within the video content; and
- causing a device to output the video content beginning at a location associated with the third image.

12. The method of claim 11, wherein the determining the third image comprises determining the third image based on a difference between the third image and the first image being within a predetermined threshold image difference.

13. The method of claim 11, wherein the first user input is user input received by the device and the second user input is user input received by another device.

14. The method of claim 11, wherein the determining the third location comprises determining the third location based on an average of the first location and the second location.

15. A method comprising:
- determining, by at least one computing device, a first portion of video content that comprises a first image;
- determining, based on the first portion of the video content, a different second portion of the video content that comprises a second image; and
- causing, based on determining that a correspondence exists between the first image and the second image, a device to output the second portion of the video content.

16. The method of claim 15, wherein the determining the first portion of the video content comprises receiving user input and determining the first portion of the video content based on a video frame, within the video content, that is being output by the device when the user input is received.

17. The method of claim 15, wherein the causing comprises causing the device to output the second portion of the video content beginning at a video frame that comprises the second image.

18. The method of claim 15, wherein the first portion of the video content is a first video frame and the second portion of the video content is a second video frame different from the first video frame.

19. The method of claim 15, wherein the determining that the correspondence exists between the first image and the second image comprises:
- comparing the first image with the second image to determine a difference between the first image and the second image; and
- determining that the correspondence exists based on the difference being less than a predetermined threshold.

20. The method of claim 15, further comprising:
- causing the device to output the first portion of the video content; and
- receiving user input associated with the first portion of the video content,
- wherein the causing the device to output the first portion of the video content comprises causing the device to skip outputting a portion of the video content between the first portion of the video content and the second portion of the video content.

* * * * *